United States Patent
Dristy et al.

(10) Patent No.: US 11,211,616 B2
(45) Date of Patent: Dec. 28, 2021

(54) MODULAR ELECTROCHEMICAL CELL COMPONENTS, STACKS, SYSTEMS, AND METHOD OF MANUFACTURE

(71) Applicant: Sustainable Innovations, Inc., East Hartford, CT (US)

(72) Inventors: Mark E. Dristy, East Hartford, CT (US); Trent M. Molter, East Hartford, CT (US); William A. G. McPhee, East Hartford, CT (US); Joshua S. Preston, East Hartford, CT (US); Gregory Hesler, East Hartford, CT (US)

(73) Assignee: SUSTAINABLE INNOVATIONS, INC., East Hartford, CT (US)

( * ) Notice: Subject to any disclaimer, the term of this patent is extended or adjusted under 35 U.S.C. 154(b) by 478 days.

(21) Appl. No.: 15/761,576

(22) PCT Filed: Aug. 31, 2016

(86) PCT No.: PCT/US2016/049649
§ 371 (c)(1),
(2) Date: Mar. 20, 2018

(87) PCT Pub. No.: WO2017/040625
PCT Pub. Date: Mar. 9, 2017

(65) Prior Publication Data
US 2018/0342742 A1    Nov. 29, 2018

Related U.S. Application Data

(60) Provisional application No. 62/212,444, filed on Aug. 31, 2015.

(51) Int. Cl.
*H01M 8/0273* (2016.01)
*H01M 8/242* (2016.01)
(Continued)

(52) U.S. Cl.
CPC ......... *H01M 8/0273* (2013.01); *H01M 8/242* (2013.01); *H01M 8/2418* (2016.02); *H01M 2008/1095* (2013.01); *Y02P 70/50* (2015.11)

(58) Field of Classification Search
CPC .. H01M 8/0273; H01M 8/0276; H01M 8/242; H01M 8/245; H01M 8/246; H01M 8/2404; H01M 8/2432
See application file for complete search history.

(56) References Cited

U.S. PATENT DOCUMENTS 4,214,969 A * 7/1980 Lawrance ................. C25B 9/04
                                                            204/255
5,227,260 A * 7/1993 Rose ....................... H01M 2/02
                                                            429/130
(Continued)

FOREIGN PATENT DOCUMENTS

WO    20090780445 A1    6/2009

OTHER PUBLICATIONS

International Search Report and Written Opinion for International Application No. PCT/US2016/049649 dated Dec. 22, 2016;15 pgs.

*Primary Examiner* — Robert S Carrico
(74) *Attorney, Agent, or Firm* — Cantor Colburn LLP (57) ABSTRACT

A method of manufacturing electrochemical cell stacks of different sizes or configurations is disclosed in which a first planar module having a first planar size and configuration is assembled from a first inventory of parts including planar modular parts having mating surfaces along connectable ends. The planar modular parts are connected in a co-planar configuration to form the first planar module having the first size and configuration. A second inventory of parts including planar modular parts in common with the first inventory is identified, and a second planar module having a different planar size or configuration than the first planar module is assembled from the second inventory. The first and second (Continued)

planar modules are assembled with other planar modules and component to form electrochemical stacks corresponding to the planar size and configuration of the respective first or second planar module.

35 Claims, 11 Drawing Sheets

(51) Int. Cl.
*H01M 8/2418* (2016.01)
*H01M 8/1018* (2016.01)

(56) References Cited

U.S. PATENT DOCUMENTS

| | | | | |
|---|---|---|---|---|
| 5,750,281 | A * | 5/1998 | Washington | H01M 8/241 429/460 |
| 6,187,155 | B1 | 2/2001 | Stuart et al. | |
| 6,257,427 | B1 * | 7/2001 | Schneid | H01M 2/1077 211/189 |
| 2001/0021470 | A1 * | 9/2001 | May | H01M 8/0206 429/414 |
| 2001/0049044 | A1 | 12/2001 | Molter | |
| 2005/0048346 | A1 * | 3/2005 | Fannon | H01M 8/0247 429/468 |
| 2005/0089751 | A1 | 4/2005 | Oogami et al. | |
| 2006/0210858 | A1 * | 9/2006 | Warrier | H01M 8/2425 429/434 |
| 2007/0122680 | A1 | 5/2007 | Eun et al. | |
| 2008/0032174 | A1 | 2/2008 | Fuglevand et al. | |
| 2010/0003589 | A1 | 1/2010 | Yoda et al. | |
| 2012/0177970 | A1 * | 7/2012 | Marchio | H01M 2/0237 429/120 |
| 2013/0189554 | A1 | 7/2013 | Schmieder | |
| 2014/0220471 | A1 * | 8/2014 | Gambini | H01M 8/249 429/457 |

* cited by examiner

MODULAR ELECTROCHEMICAL CELL COMPONENTS, STACKS, SYSTEMS, AND METHOD OF MANUFACTURE

This application is a National Stage Application of Patent Application PCT/US2016/049649 filed on Aug. 31, 2016, which claims the benefit of and priority to U.S. Provisional Application No. 62/212,444, filed Aug. 31, 2015, the contents of which are incorporated herein by reference in their entirety.

BACKGROUND

The subject matter disclosed herein relates to electrochemical cells, and in particular to modular components for electrochemical cells and stacks, and methods of manufacture.

Electrochemical cells are commonly used in a stack configuration for a variety of applications such as electricity generation from hydrogen or hydrocarbon fuel, production and compression of hydrogen, production and compression of oxygen or oxygen-enriched air, or production of nitrogen-enriched air. Although stack configurations can vary, a common design involves a series membranes (e.g., proton exchange membranes, also known as polymer electrolyte membranes or "PEM") in planar membrane electrode assemblies ("MEA"), each disposed in a stackable frame, separated by electrically conductive separator plates, also referred to as bi-polar plates. The bi-polar plates serve to connect the stacked MEA's in series, and to separate the fluid on the anode side of each MEA from the fluid on the cathode side of the adjacent MEA in the stack. Fluid flow channels to deliver and receive fluid flow from cells are commonly incorporated in the frames of the stacked components. The stack typically has an end plate at each end of the stack. The stacked components are assembled under a compressive load from bolts extending between the end plates through the stack.

Electrochemical cells and stacks are designed and fabricated in a wide variety of sizes and configurations. This has typically necessitated the custom design and fabrication of a wide variety of components of different sizes, which can lead to increased cost, complexity, and difficulty to maintain quality. Additionally, some components can be difficult or more costly to maintain manufacturing specifications when manufactured in some sizes. Cross-membrane pressure differentials in electrochemical cells can be quite high (e.g., up to 2400 psi for some applications), which necessitates a considerable degree of precision in order to provide effective, leak-free cell operation. Such precision can be readily achieved for stacks having a relatively small active area per cell, but as the per-cell active area increases, components such as cell frame components, membranes, etc., become increasingly difficult to fabricate to the desired specifications.

BRIEF DESCRIPTION OF THE INVENTION

According to some aspects of the invention, there is a method of manufacturing electrochemical cell stacks of different sizes or configurations. According to the method, a first planar module having a first planar size and configuration is assembled from a first inventory of parts comprising planar modular parts having mating surfaces along connectable ends thereof. The planar modular parts are connected together, in a co-planar configuration to form the first planar module having the first size and configuration. The first planar module is assembled into the first electrochemical stack comprising a plurality of planar modules to form a first electrochemical stack corresponding to the first planar size and configuration. A second inventory of parts including planar modular parts in common with the first inventory is identified, and a second planar module having a different planar size or configuration than the first planar module is assembled from the second inventory. The second planar module is assembled into a second electrochemical stack comprising a plurality of planar modules to form the second electrochemical stack corresponding to the first planar size and configuration.

According to some aspects of the invention, a planar electrochemical cell module comprises a planar peripheral frame that comprises a plurality of planar modular frame parts connected together at mating surfaces along interconnecting ends of the modular planar peripheral frame parts to extend connected modular planar peripheral frame parts along the plane of the planar peripheral frame.

According to some aspects of the invention, an electrochemical cell stack comprises a planar endplate that comprises a plurality of planar modular endplate parts connected together at mating surfaces along interconnecting ends of the modular planar endplate parts to extend connected modular planar endplate parts along the plane of the planar endplate.

According to some aspects of the invention, a planar electrochemical cell comprises a plurality of planar cell modules comprising components selected from proton exchange membranes, separator plates, electrodes, flow fields, or combinations thereof. The planar cell modules are disposed along a common plane of the electrochemical cell, and are connected at mating surfaces along perimeter ends of the planar cell modules to frame members of a frame comprising a plurality of framed spaces.

According to some aspects of the invention, an electrochemical cell stack comprises a planar electrical bus plate that comprises a plurality of planar modular electrical bus plate parts connected together at mating surfaces along interconnecting ends of the modular planar electrical bus plate parts to extend connected modular planar electrical bus plate parts along the plane of the planar electrical bus plate.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

The detailed description explains representative embodiments, together with advantages and features, by way of example with reference to the drawings.

Figure 1:
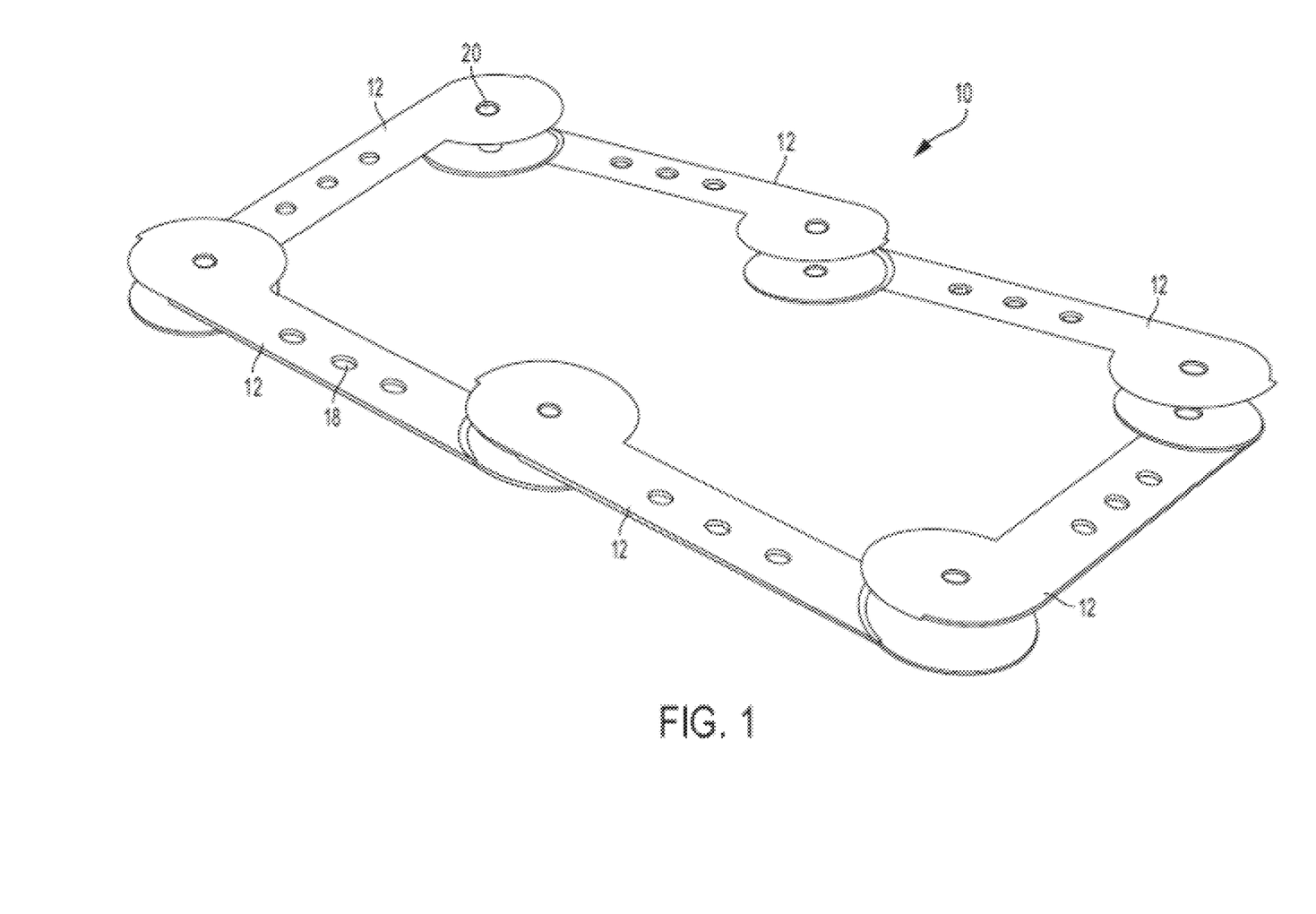
FIG. 1 is a schematic depiction of an exploded view of a frame module as described herein.
Figure 2:
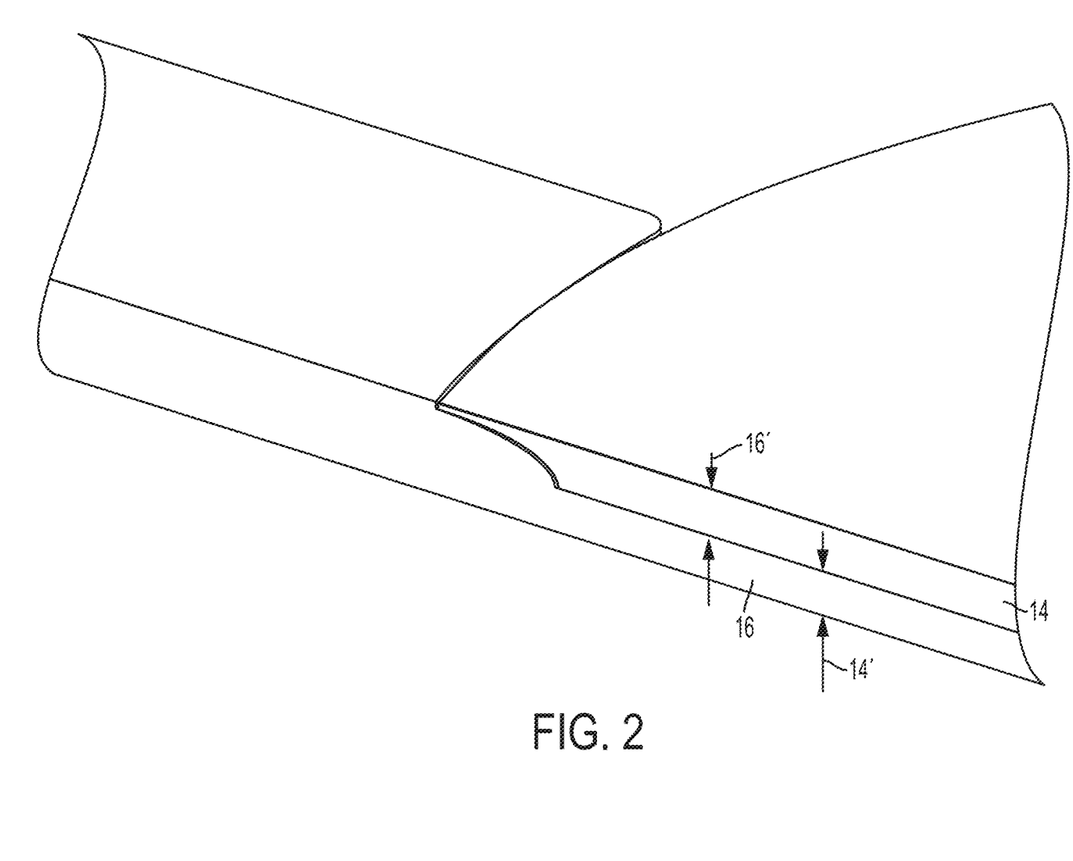
FIG. 2 is a schematic depiction of an assembled view of a magnified portion of a frame module as described herein.

In some examples of embodiments, the above-described first and second modules can be cell frames, electrical bus plates, end plates, or cell components selected from proton exchange membranes, separator plates, electrodes, flow fields, or combinations thereof. Referring now to FIG. 1, an exemplary cell frame module 10 is depicted in an exploded view. As shown in FIG. 1, six planar modular frame parts 12 are assembled together to form the frame module 10. As shown in the magnified view of FIG. 2, the modular frame parts 12 are connected together at mating surfaces 14, 16 that are recessed in a direction perpendicular to the plane of the planar module, with mating surface 14 recessed by a dimension 14' and mating surface 16 recessed by a dimension 16'. The connection can be facilitated with adhesive or brazing, and/or interlocking features (not shown) along the mating surfaces 14, 16. The planar modular frame parts 12 can have openings 18 therein such as for transportation of fluids to and from the electrochemical cell, and electrically non-conductive openings 20 to accommodate a stack assembly bolt when the frame module is incorporated into a cell stack.

Figure 3A:
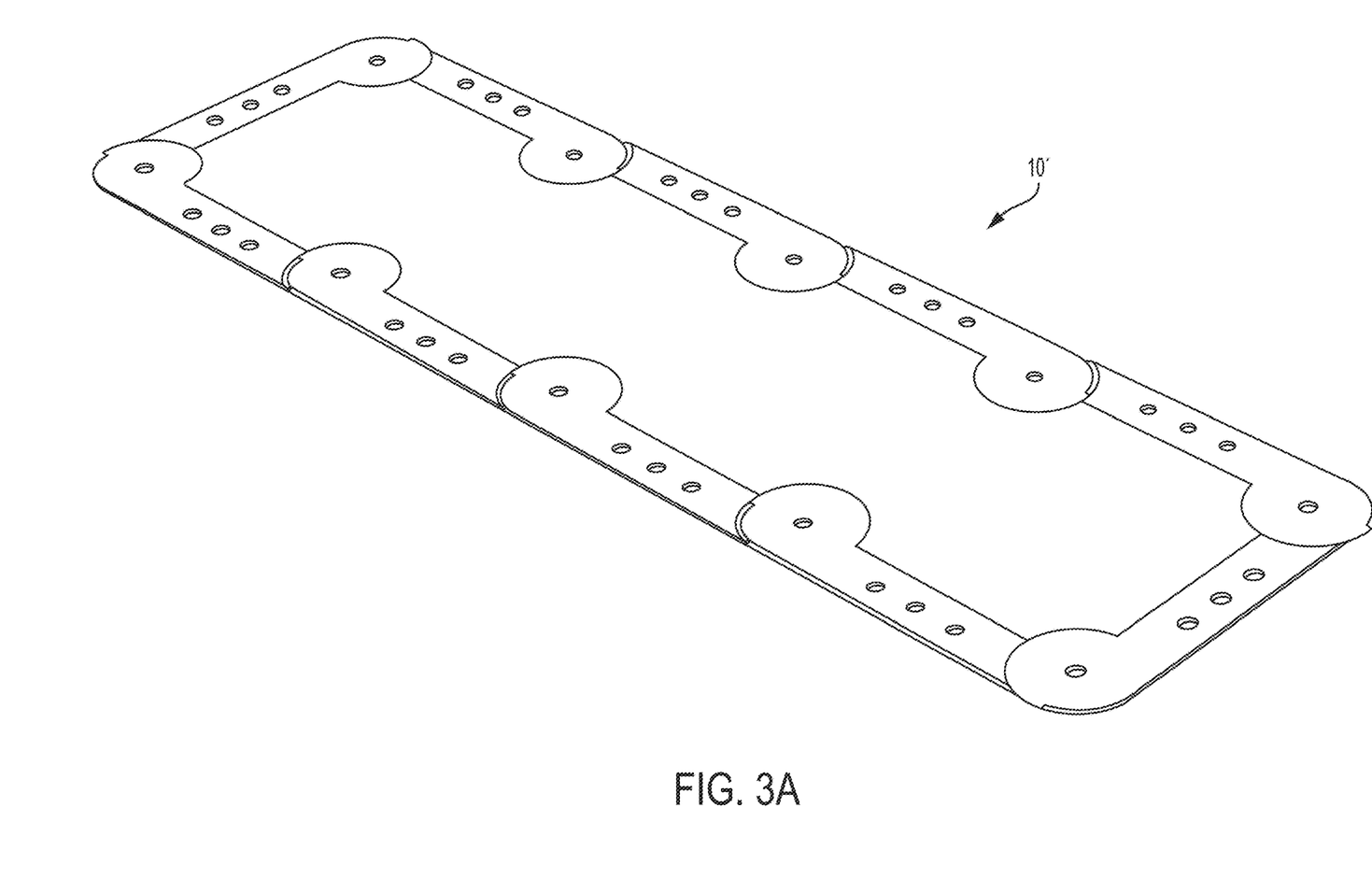
FIGS. 3 and 3B are schematic depictions of assembled views of frame modules as described herein.
Figure 3B:
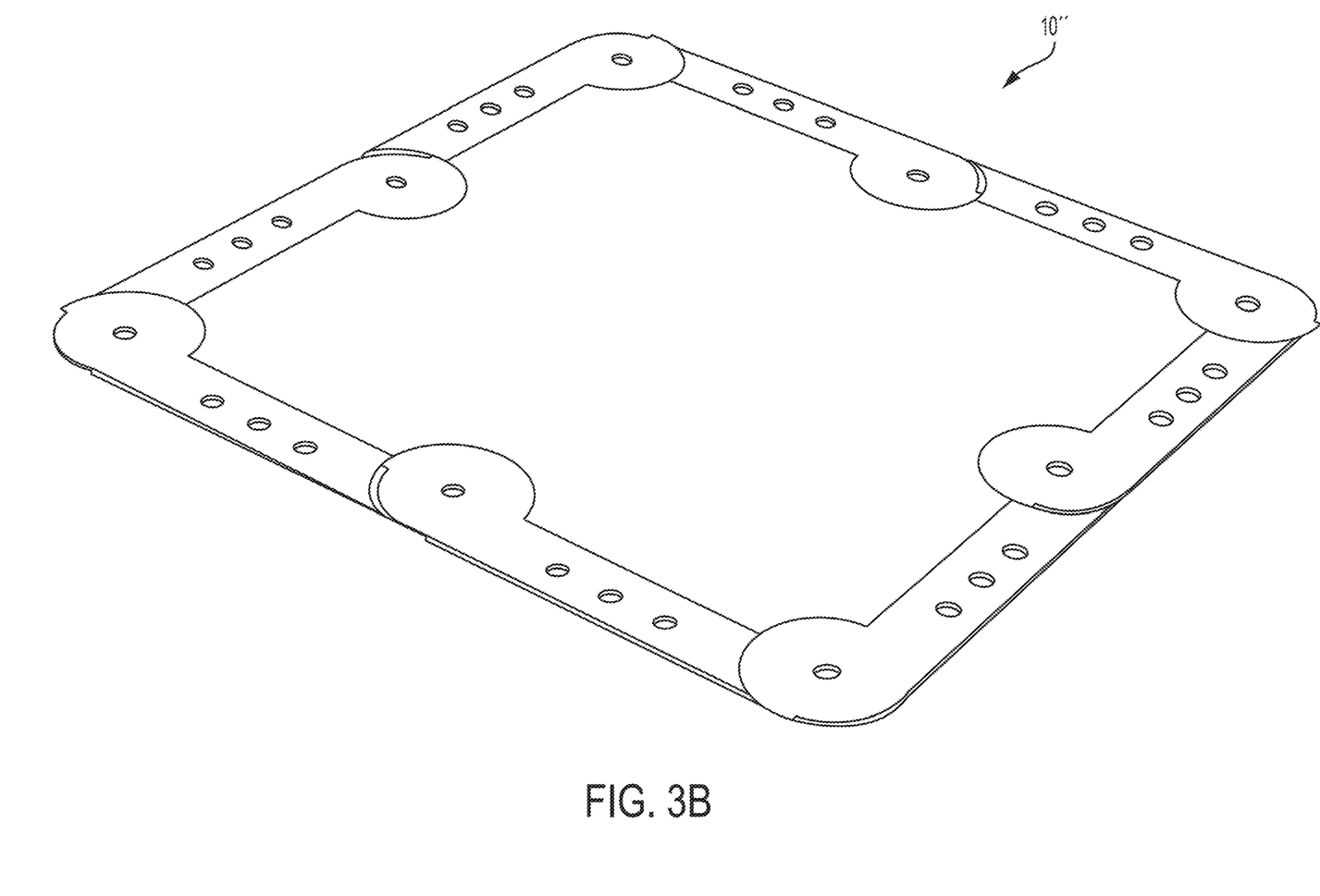

The planar modular frame parts can be part of a common inventory of parts used to form a second planar module having a different size and/or configuration than a first planar module. For example, planar modules having a different size and configuration than the module shown in FIG. 1 are shown in FIGS. 3A and 3B. FIG. 3A shows a planar frame module 10' having twice the size (as characterized by surface area) of the frame of FIG. 1 assembled from ten of the modular frame parts 12 (shown, but not individually numbered). FIG. 3B shows a planar frame module 10" having the same size (surface area) as that of FIG. 3A, but with a different configuration assembled from eight of the modular frame parts 12 (shown, but not individually numbered).

Figure 4A:
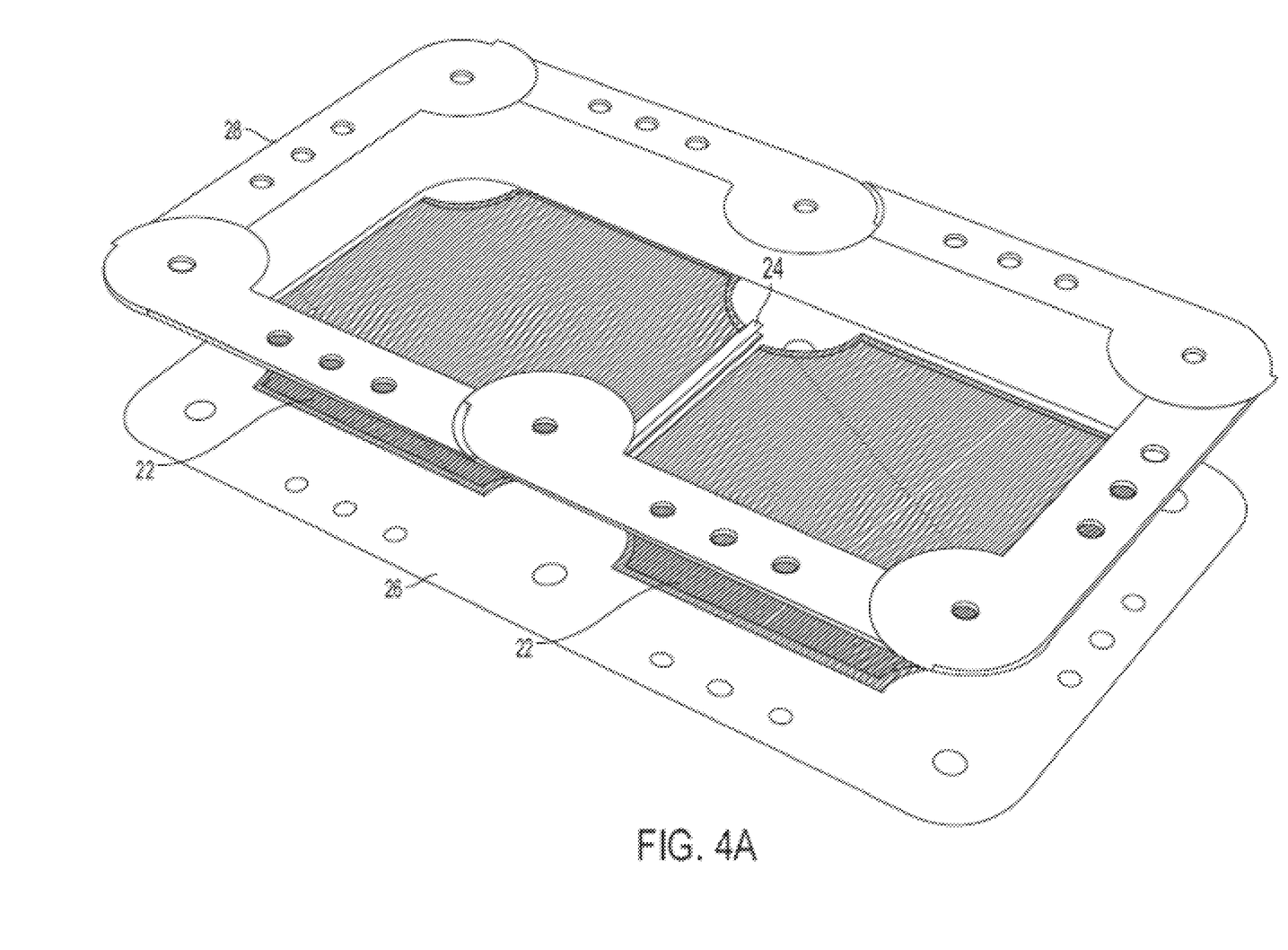
FIGS. 4A and 4B are schematic depictions of exploded views of multi-element modules as described herein.
Figure 4B:
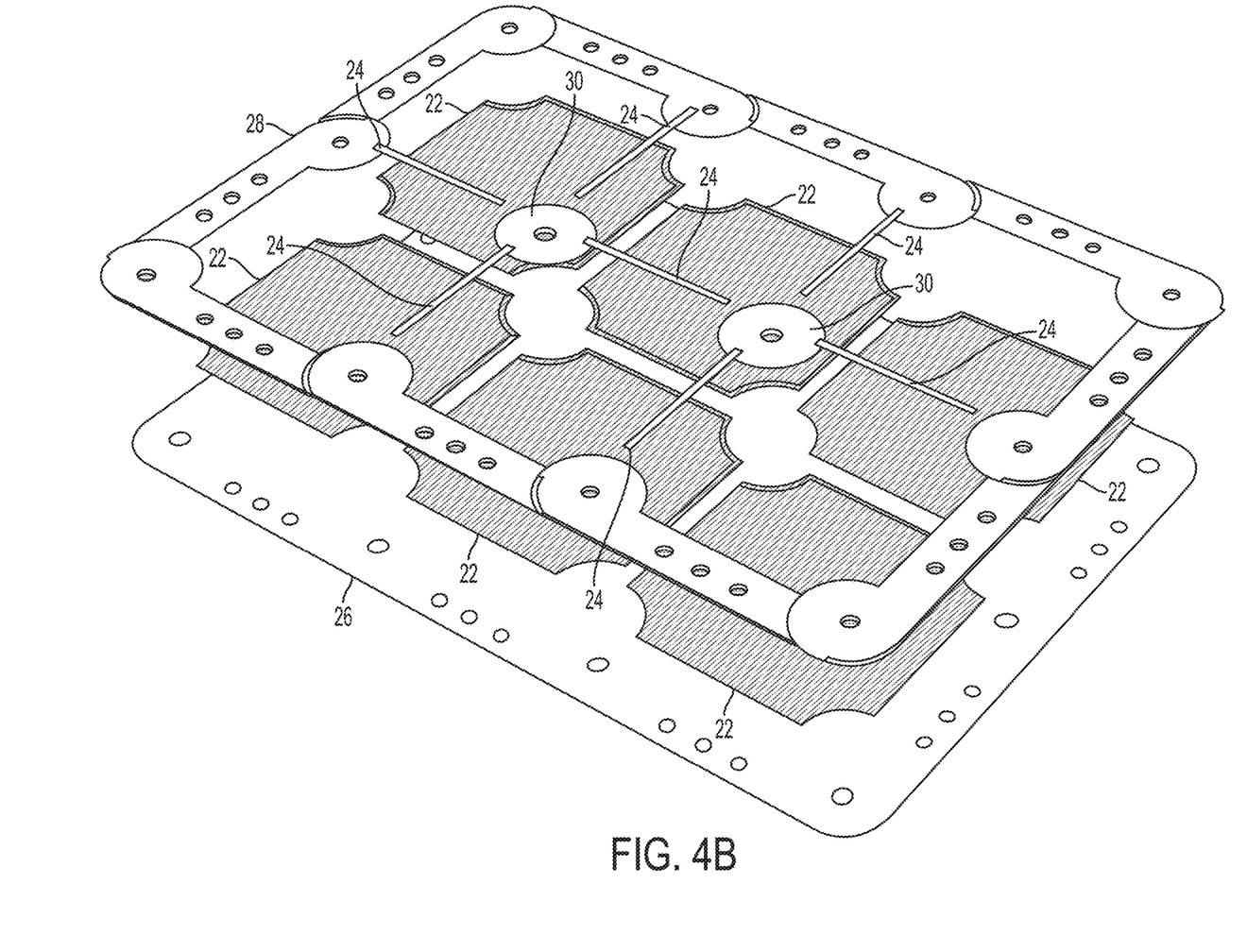

As mentioned above, the first and second modules assembled from an inventory of parts including a common inventory of planar modular parts can be proton exchange membranes, separator plates, electrodes, flow fields, or combinations thereof. An example of such an embodiment is shown in an exploded view in FIGS. 4A and 4B, which depict planar flow fields of different sizes/configurations assembled from a plurality of planar flow field modular parts 22 (two planar flow field component parts 22 in FIG. 4A and six planar flow field component parts 22 in FIG. 4B). The flow field component parts 22 are connected together along mating surfaces through protective bridge strip elements 24, which help protect sensitive elements such as the proton exchange membrane at the interface between adjacent flow field component parts 22. As shown in FIGS. 4A and 4B, the flow field modular parts 22 are assembled together with a unitary separator plate 26 and a planar frame 28 to form a portion of an electrochemical cell. Flow field modular parts 22 are also typically disposed on the opposite side of the separator plate 26 from the view depicted in FIGS. 4A and 4B so as to provide both anode-side and cathode-side flow fields. The planar frame 28 can be assembled from planar frame modular parts 12 as shown in FIGS. 4A and 4B or can be a unitary frame. Electrically non-conductive bolt pass-through elements 30 provide openings for stack assembly bolts (not shown).

Figure 5A:
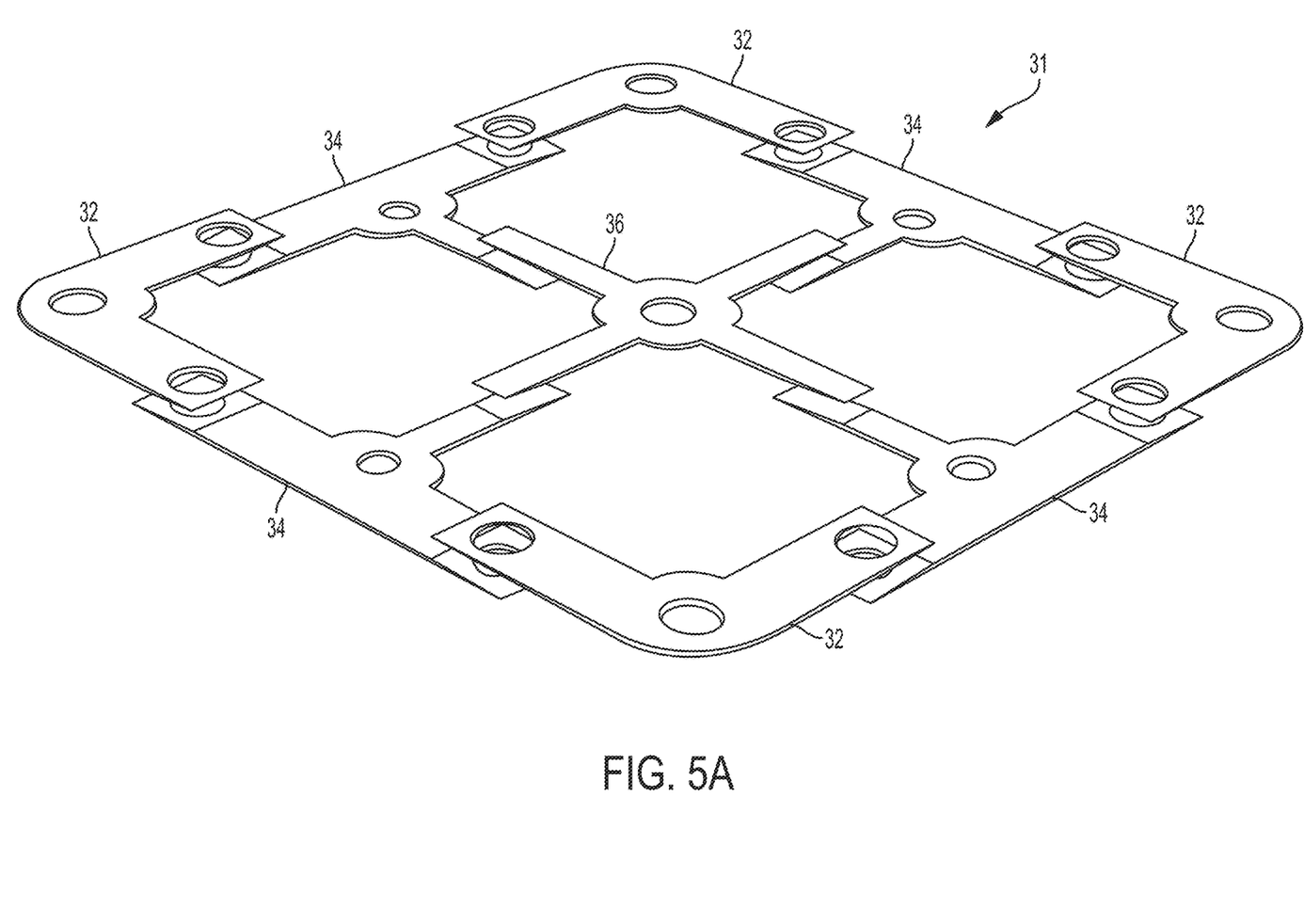
FIGS. 5A and 5B are schematic depictions of frame modules having external and internal frame parts as described herein.
Figure 5B:
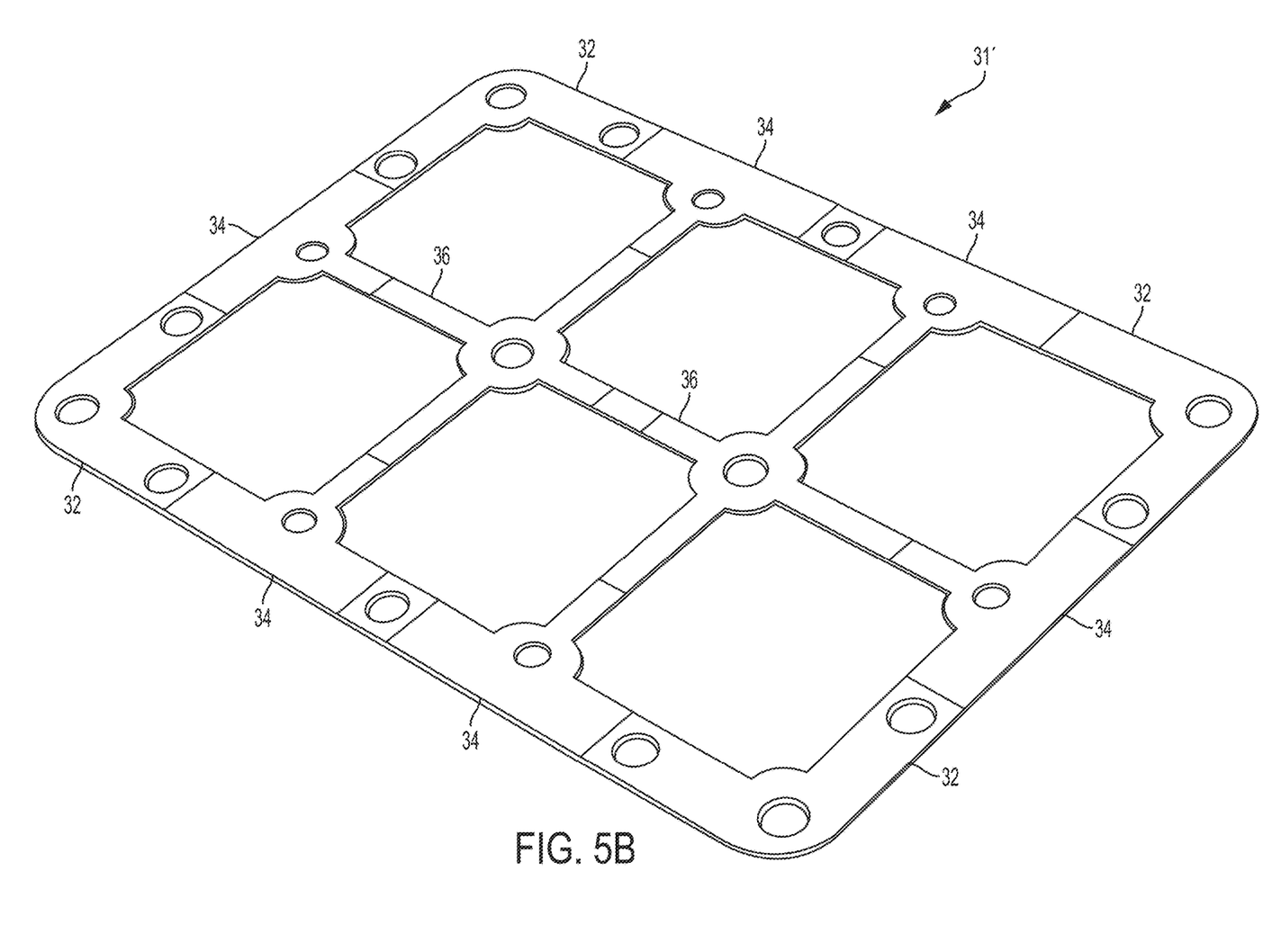

In some embodiments, a planar frame assembled from planar frame components can include a peripheral frame and an internal frame, as shown by way of example in FIGS. 5A and 5B. As shown in FIGS. 5A and 5B, planar frame modules 31 and 31' are depicted in an exploded view (FIG. 5A) and assembled view (FIG. 5B) is assembled from planar cell frame modular parts 32, 34, and 36. As shown in FIGS. 5A and 5B, the assembled frame includes a peripheral frame portion formed by planar cell frame modular parts 32 and 34, and an internal frame portion formed by cell frame modular part 36 and the inwardly-extending portions 34' of the cell frame modular parts 34.

Figure 6:
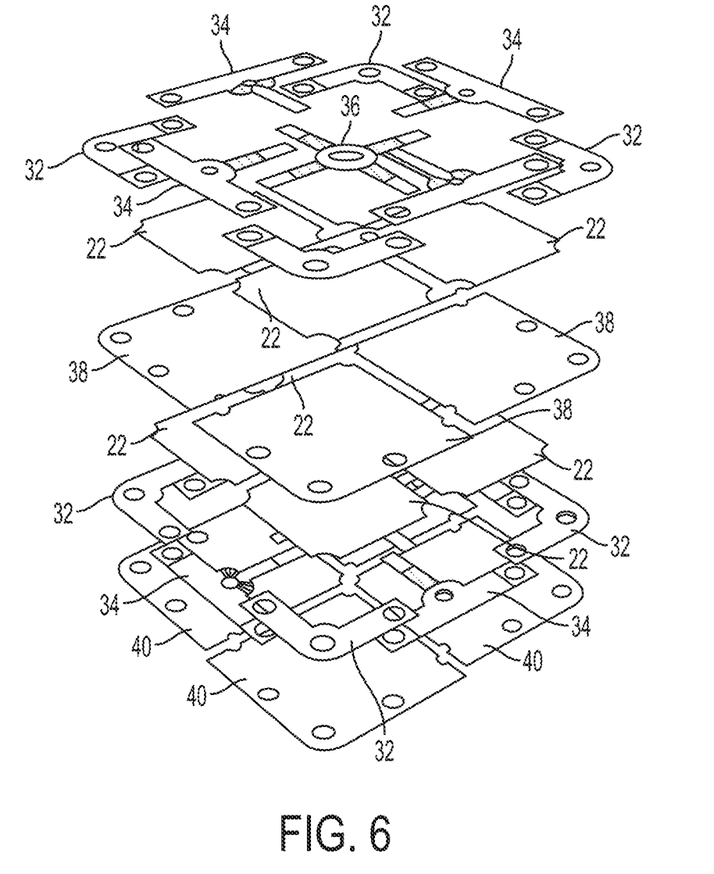
FIG. 6 is a schematic depiction of multi-element modules as described herein.

Of course, the assembly of first and second planar modules from parts inventories including modular parts common to both inventories is not limited to a single type of module. FIGS. 4A and 4B illustrate an embodiment where both frame parts and flow fields are assembled from parts inventories including modular parts common to both inventories. As mentioned above, other types of modules can also be assembled from common parts inventories. Internal frames such as shown in FIGS. 5A and 5B can provide a sealing surface so that other components such as membranes or separator plates can be assembled from planar modular parts instead of a unitary membrane or separator plate covering the entire surface area of a stack cell footprint. An example of such an embodiment is depicted in FIG. 6, which depict cell modules of different sizes/configurations assembled from a plurality of planar modular parts. As shown in FIG. 6, membrane modular parts 38, flow field modular parts 22, and separator plate modular parts 40 are connected (indirectly, through the planar cell frame modular parts 34', 36) in a co-planar configuration to form a complete planar cell module for inclusion in a cell stack. Electrodes (not shown) can be disposed on opposite sides of the membrane, and can be printed or coated onto the membrane or integrated into the flow field as is known in the art. As with other modules disclosed herein, the module depicted in FIG. 6 can be assembled in different sizes and/or configurations, for example in the size/configuration of the frame 31 from FIG. 5A (as shown in FIG. 6) and/or in the size/configuration of the frame 31' from FIG. 5B.

Another type of electrochemical cell stack module that can be assembled in different sizes/configurations as described herein is an intermediate module as described in more detail in U.S. patent application Ser. No. 62/097,481 filed Dec. 29, 2014, the disclosure of which is incorporated herein by reference in its entirety. These intermediate modules can (i) include a cavity disposed internally within the intermediate module that is in fluid communication with a fluid source at a pressure higher than the operating pressure of the electrochemical cell stack on either side of the intermediate module, and/or (ii) can provide an electrically non-conductive channel along a fluid communication path between electrochemical cells having a different operating voltage for electrically conductive process liquids in fluid communication with a plurality of electrochemical cells in the stack. The intermediate modules can include plates that provide a mount for anchors against lateral stress resulting from stack operating pressures. The anchors are disposed along a perimeter portion of at least one plate, with the anchors extending from plate in a direction perpendicular to the plane of the stacked planar modules. The anchors include a surface portion that provides structural support along the external perimeter surface of the stacked planar modules against stress in a direction parallel to the plane of the stacked planar module.

Figure 7:
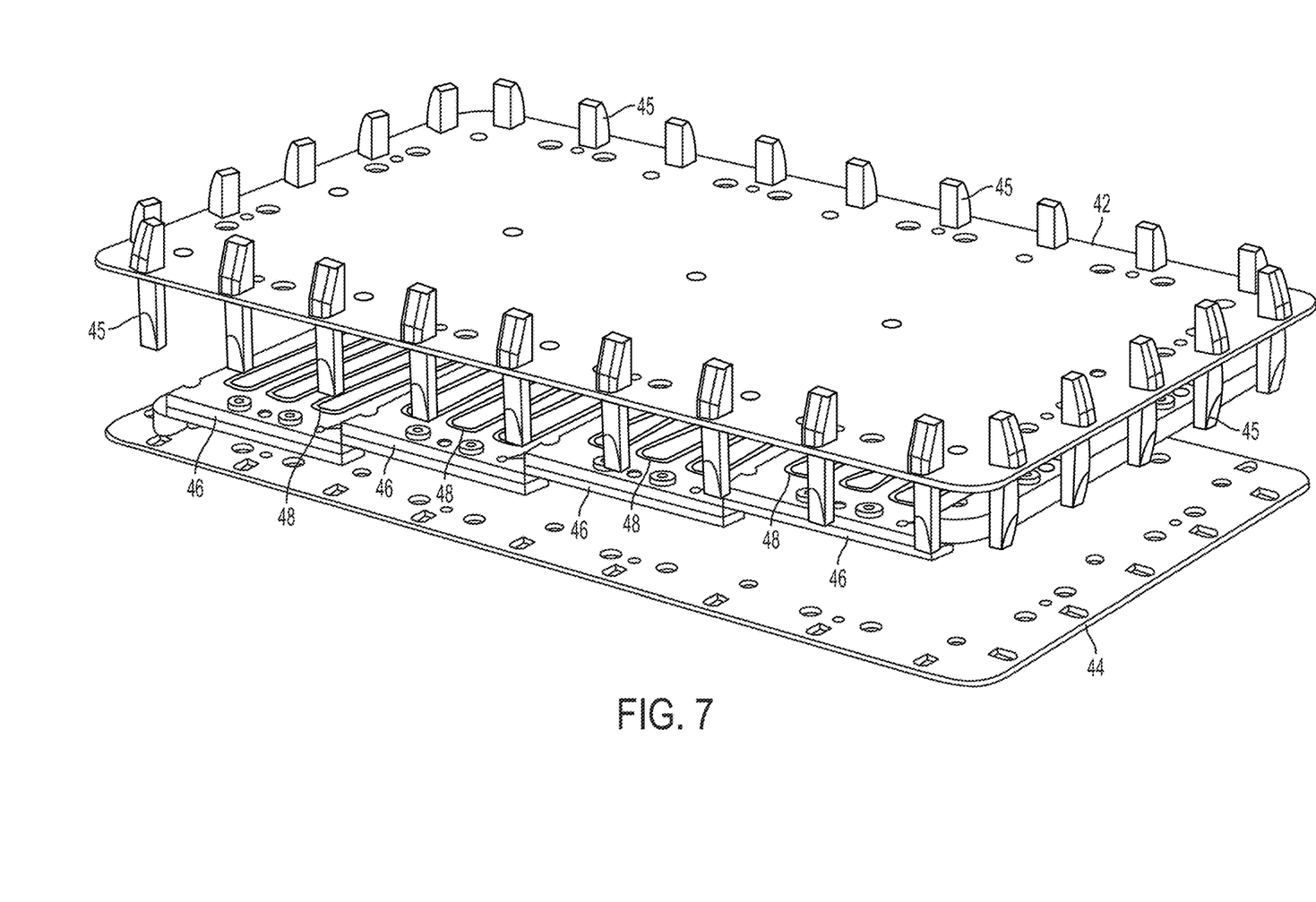
FIG. 7 is a schematic depiction of another module as described herein.

An example of an embodiment is shown in an exploded view in FIG. 7, with intermediate module endplates 42 and 44 having an intermediate module inner plate disposed between the intermediate module endplates 42, 44. Anchors 45 provide reinforcement against lateral stress from pressurized fluids during operation. The intermediate module inner plate is assembled from intermediate module inner plate planar modular parts 46 having optional cooling fluid flow channels 48 disposed therein. The intermediate module inner plate can be assembled with different numbers and/or configurations of the inner plate planar modular parts 46 in similar fashion as described above.

Figure 8:
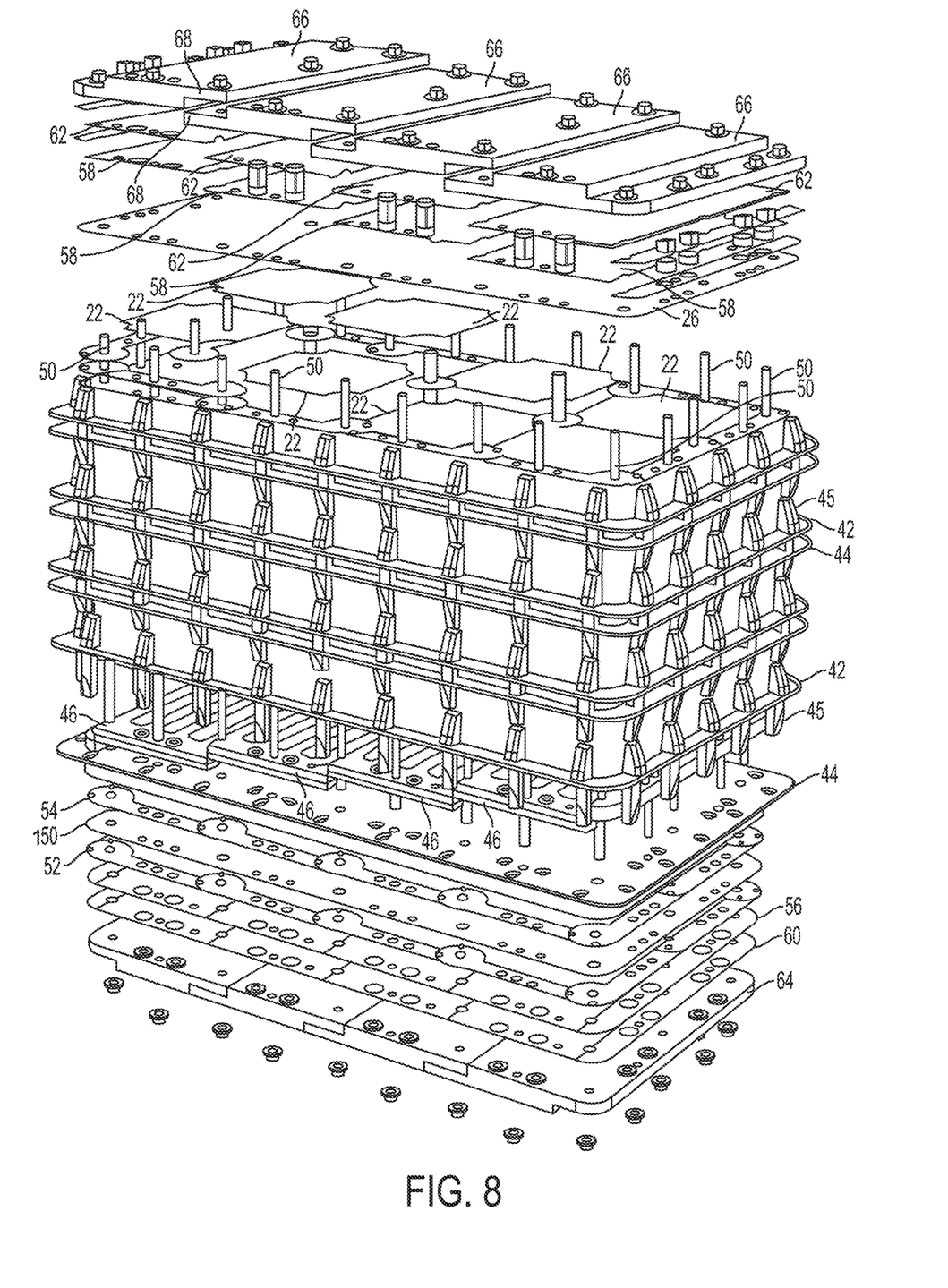
FIG. 8 is a schematic depiction of an electrochemical cell stack including multiple modules as described herein.

The various modules described herein can be assembled together in an electrochemical cell stack. An example of such an embodiment is shown in a partially-exploded view in FIG. 8. As shown in FIG. 8, the stack includes membranes 150, cathode-side cell assemblies 52, and anode-side cell assemblies 54. As shown in the upper exploded view portion of FIG. 8, the cathode-side and anode-side cell assemblies include a separator plate 26 and modular flow field parts 22 in a planar frame 28 made from modular frame parts 12. As further shown in FIG. 8, the stack also includes intermediate modules assembled from intermediate module inner plate planar modular parts 46, intermediate module endplates 42, 44, and anchors 45. Bolts or tie-rods 50 and nuts 52 apply a compressive load to the stack.

With continued reference to FIG. 8, additional modules are seen to be assembled from planar modular parts are connected in co-planar fashion along mating surfaces. Electrical bus plates 56 are assembled from planar electrical bus plate module parts 58, which are butted against one another in electrically-conductive contact. Insulator plates 60 are assembled from planar insulator plate module parts 62 to electrically insulate endplates 64 from the electrical bus plates 54. Endplates 64 are assembled from planar endplate module parts 66. In some embodiments, the endplate module parts 66 are connected at overlapping mating surfaces 68 that are recessed in a direction perpendicular to the plane of the planar endplate As mentioned above, the electrochemical cell stacks typically include polymer electrolyte membranes having an anode and a cathode disposed on opposite sides thereof. An anode-side flow field structure and a cathode-side flow field structure are typically disposed on either side of the membrane. These flow field structures are typically disposed distal from the membrane, with the MEA and flow field structures each mounted in a frame assembly as described above to provide space for fluid flow in contact with the MEA. The flow field structures can be electrically conductive (e.g., a steel mesh) to provide an electrical connection through a conductive separator plate from a cathode of one cell to the anode of an adjacent cell so that the cells of the stack are electrically connected in series. Proton exchange membranes can comprise electrolytes that are solids under the operating conditions of the electrochemical cell. Useful materials from which the membranes can be fabricated include proton conducting ionomers and ion exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION® resins (commercially available from E. I. du Pont de Nemours and Company, Wilmington, Del.).

Anodes and cathodes can be fabricated from catalytic materials suitable for performing the needed electrochemical reaction (e.g., the dissociation of water or hydrogen gas). Suitable catalytic materials include, but are not limited to, platinum, palladium, rhodium, carbon, gold, tantalum, tungsten, ruthenium, iridium, osmium, alloys thereof, and the like, as well as combinations of the foregoing materials. Anodes and cathodes are positioned adjacent to, and preferably in contact with, their respective electrolyte membranes and can have structures comprising discrete catalytic particles adsorbed onto a porous substrate. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of proton exchange membranes or onto support members.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of manufacturing electrochemical cell stacks of different sizes or configurations, comprising:
    assembling a first planar module having a first planar size and configuration from a first inventory of parts comprising planar modular parts having mating surfaces along connectable ends thereof, including connecting the planar modular parts together in a co-planar configuration to form the first planar module having the first size and configuration; wherein the planar modular parts form a frame having an opening therein; wherein each of the plurality of planar modular parts has an opening edge and wherein the opening edges from the plurality of planar modular parts form the opening;
    assembling the first planar module in a first electrochemical stack comprising a plurality of planar modules to form the electrochemical stack corresponding to said first planar size and configuration;
    identifying a second inventory of parts including planar modular parts in common with the first inventory, and assembling from the second inventory a second planar module having a different planar size or configuration than the first planar module; and
    assembling the second planar module in a second electrochemical stack comprising a plurality of planar modules to form the second electrochemical stack corresponding to said second planar size or configuration.

2. The method of claim 1, wherein the second planar module comprises a different number of the common planar modular parts than the number of said common planar modular parts in the first planar module.

3. The method of claim 1, wherein the second planar module comprises the same number of common planar modular parts as the number of said common planar modular parts in the first planar modular, in a different configuration than the first planar module.

4. The method of claim 1, wherein the plurality of planar modular parts have a connection between a portion along the mating surface of a first planar modular part that is recessed in a direction perpendicular to the plane of the planar module, and a portion along the mating surface of a second planar modular part that is configured complementary to the recessed portion of the first planar modular part.

5. The method of claim 1, wherein the first and second modules are each cell frames, electrical bus plates, end plates, or cell components selected from proton exchange membranes, separator plates, electrodes, flow fields, or combinations thereof.

6. The method of claim 5, wherein the first and second modules are each cell frames.

7. The method of claim 5, wherein the first and second modules are each end plates.

8. The method of claim 5, wherein the first and second modules are each electrical bus plates.

9. The method of claim 5, wherein the first and second modules are each selected from proton exchange membranes, separator plates, electrodes, flow fields, or combinations thereof.

10. A planar electrochemical cell module comprising a planar peripheral frame that comprises a plurality of planar modular frame parts connected together at mating surfaces along interconnecting ends of the planar modular frame parts to extend connected planar modular frame parts along the plane of the planar peripheral frame;
wherein the plurality of planar modular frame parts forms a frame having an opening therein; wherein each of the plurality of planar modular frame parts has an opening edge and wherein the opening edges from the plurality of planar modular frame parts form the opening.

11. The planar electrochemical cell module of claim 10, wherein the planar peripheral frame retains a functional module.

12. The planar electrochemical cell module of claim 11, wherein the functional module is selected from proton exchange membranes, separator plates, electrodes, flow fields, or combinations thereof.

13. The planar electrochemical cell module of claim 11, wherein the planar modular frame parts include or cooperate to include an electrically non-conductive opening therein for a stack assembly bolt, and wherein the electrically non-conductive opening extends through the functional module.

14. The planar electrochemical cell module of claim 10, wherein the planar modular frame parts are connected along the mating surface of a first planar modular frame part that is recessed in a direction perpendicular to the plane of the planar peripheral frame, and a portion along the mating surface of a second planar modular frame part that is configured complementary to the recessed portion of the first modular planar peripheral frame part.

15. The planar electrochemical cell module of claim 10, further comprising a planar internal frame retained within the planar peripheral frame.

16. The planar electrochemical cell module of claim 15, wherein the planar internal frame comprises a plurality of planar modular internal frame parts connected to each other or to the planar peripheral frame along mating surfaces thereof.

17. The planar electrochemical cell module of claim 16, wherein the modular planar internal frame parts are connected along the mating surface of a first planar modular peripheral frame part that is recessed in a direction perpendicular to the plane of the planar peripheral frame, and a portion along the mating surface of a second planar modular internal or peripheral frame part that is configured complementary to the recessed portion of the first planar modular internal frame part.

18. The planar electrochemical cell module of claim 15, wherein the planar internal frame together with the planar peripheral frame forms a plurality of framed spaces.

19. The planar electrochemical cell module of claim 18, wherein the plurality of framed spaces retain functional modules.

20. The planar electrochemical cell module of claim 19, wherein the functional modules are selected from proton exchange membranes, separator plates, electrodes, flow fields, or combinations thereof.

21. The planar electrochemical cell module of claim 10, wherein the planar modular frame parts include or cooperate to include an electrically non-conductive opening therein for a stack assembly bolt.

22. The planar electrochemical cell module of claim 21, wherein the opening extends through the mating surfaces of two joined planar modular frame parts.

23. An electrochemical cell stack comprising a plurality of the planar electrochemical cell modules of claim 10.

24. The electrochemical cell stack according to claim 23, wherein the planar modular frame parts include or cooperate to include an electrically non-conductive opening therein for a stack assembly bolt; wherein the stack assembly bolt extends through the electrically non-conductive opening in planar modular frame parts.

25. An electrochemical cell stack comprising a planar endplate that comprises a plurality of planar modular endplate parts connected together at mating surfaces along interconnecting ends of the modular planar endplate parts to extend connected modular planar endplate parts along the plane of the planar endplate; and
a planar modular frame comprising a plurality of planar modular frame parts connected together at mating surfaces along interconnecting ends of the planar modular frame parts to extend connected planar modular frame parts along the plane of the planar peripheral frame; wherein the plurality of planar modular frame parts forms a frame having an opening therein; wherein each of the plurality of planar modular frame parts has an opening edge and wherein the opening edges from the plurality of planar modular frame parts form the opening.

26. The electrochemical cell stack of claim 25, wherein the modular planar endplate parts are connected along the mating surface of a first modular planar endplate part that is recessed in a direction perpendicular to the plane of the planar endplate, and a portion along the mating surface of a second modular planar endplate part that is configured complementary to the recessed portion of the first modular planar endplate part.

27. The electrochemical cell stack of claim 26, further comprising a stack assembly bolt extending through a joined mating surface of the first and second modular endplate parts.

28. A planar electrochemical cell comprising a plurality of planar cell modules comprising components selected from proton exchange membranes, separator plates, electrodes, flow fields, or combinations thereof, said planar cell modules disposed along a common plane of the electrochemical cell, said planar cell modules connected at mating surfaces along perimeter ends of the planar cell modules to planar modular frame members of a frame comprising a plurality of openings, thereby forming framed planar cell modules; wherein each of the planar modular frame members has an opening edge and wherein the opening edges of the planar modular frame members form the openings.

29. The planar electrochemical cell of claim 28, wherein the framed planar cell modules comprise separator plates.

30. The planar electrochemical cell of claim 29, wherein the framed planar cell modules further comprise proton exchange membranes, electrodes, flow fields, or combinations thereof.

31. The planar electrochemical cell of claim 30, wherein the framed planar cell modules comprise proton exchange membranes, separator plates, electrodes, and flow fields.

32. The planar electrochemical cell of claim 28, comprising a unitary proton exchange membrane, and wherein the framed planar cell modules comprise separator plates, electrodes, flow fields, or combinations thereof.

33. The planar electrochemical cell of claim 32, wherein the framed planar cell modules comprise separator plates, electrodes, and flow fields.

34. The planar electrochemical cell of claim 28, comprising a unitary proton exchange membrane and a unitary separator plate, and wherein the framed planar cell modules comprise electrodes and flow fields.

35. An electrochemical cell stack comprising a planar electrical bus plate that comprises a plurality of planar modular electrical bus plate parts connected together at mating surfaces along interconnecting ends of the modular planar electrical bus plate parts to extend connected modular planar electrical bus plate parts along the plane of the planar electrical bus plate; and a planar modular frame comprising a plurality of planar modular frame parts connected together at mating surfaces along interconnecting ends of the planar modular frame parts to extend connected planar modular frame parts along the plane of the planar peripheral frame; wherein the plurality of planar modular frame parts forms a frame having an opening therein; wherein each of the planar modular frame parts have an opening edge and wherein the opening edges of the planar modular frame parts form the opening.

* * * * *